Oct. 27, 1964  W. H. WORTHINGTON  3,154,025
LOAD HANDLING EQUIPMENT

Filed Dec. 3, 1962  3 Sheets-Sheet 1

INVENTOR.
WAYNE H. WORTHINGTON

BY *Llaisedell Scott*

ATTORNEY

Oct. 27, 1964 W. H. WORTHINGTON 3,154,025
LOAD HANDLING EQUIPMENT
Filed Dec. 3, 1962 3 Sheets-Sheet 2

INVENTOR.
WAYNE H. WORTHINGTON
BY
ATTORNEY

Oct. 27, 1964   W. H. WORTHINGTON   3,154,025
LOAD HANDLING EQUIPMENT
Filed Dec. 3, 1962   3 Sheets-Sheet 3

INVENTOR.
WAYNE H. WORTHINGTON
BY
ATTORNEY

United States Patent Office 3,154,025
Patented Oct. 27, 1964

3,154,025
LOAD HANDLING EQUIPMENT
Wayne H. Worthington, 720 Prospect Blvd.,
Waterloo, Iowa
Filed Dec. 3, 1962, Ser. No. 241,719
11 Claims. (Cl. 104—126)

This invention relates to load handling equipment and especially for use in vehicles such as motor trucks and the like.

In a typcal situation in which a truck, whether flat-bed or van, is provided with built-in means for loading and unloading same, the basic structure normally requires an overhead movable element incorporating a hoist whereby articles to be loaded and unloaded may be lifted and transported either onto or off of the truck. One of the problems is to provide such equipment in such manner that it has an adequate range of movement without unduly complicating its structure. Fundamentally, a track and trolley system will be employed and, in most cases, the range of the trolley is limited to the length of the track. If the track is made longer, it will be caused to extend beyond the structural limits of the vehcle, which is undesirable. Accordingly, it has been found expedient to provide a telescoping structure, basically including a boom carried by the track and the trolley is in turn carried by the boom. Although fundamentally this is a desirable arrangement, some means must be found for controlling the position of the trolley and boom so that the boom does not inadvertently extend beyond the track while the trolley is being moved within the limited range of the vehicle itself.

According to the present invention, a simplified and satisfactory arrangement is provided whereby the position of the trolley controls the boom, which is to say that so long as the trolley moves within the range of the track, the boom itself is stationary in a starting or normal position. However, when it is desired to exceed this range, the trolley automatically releases the boom for extension so that the length of the track, so to speak, is increased. It is an object of the invention to provide automatic boom control means responsive to positoning of the trolley. It is a further object of the invention to lock the boom in place while the trolley is travelling in a range limited generally to the length of the track. It is a still further object of the invention to provide a two-way extending boom, which is normally fixed against movement while the trolley travels in its limited range but which is released for extension at either end of the track in response to certain positioning of the trolley. Further objects of the invention are to provide a system which may be readily incorporated in vehcles of different types.

The foregoing and other important objects and desirable features inherent in and encompassed by the invention will become apparent as preferred embodiments thereof are disclosed in detail in the ensuing description and accompanying sheets of drawings, the figures of which are described below.

Figure 1:
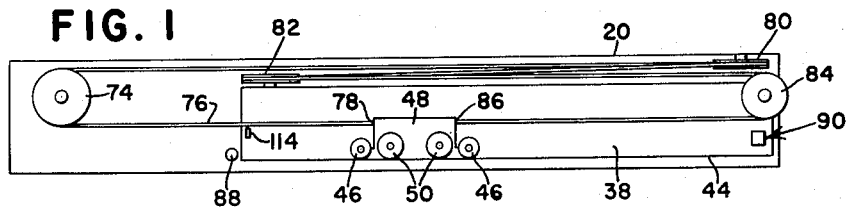
FIGURE 1 is a schematic view of one form of track-boom-trolley system, showing the boom in its retracted position.
Figure 2:
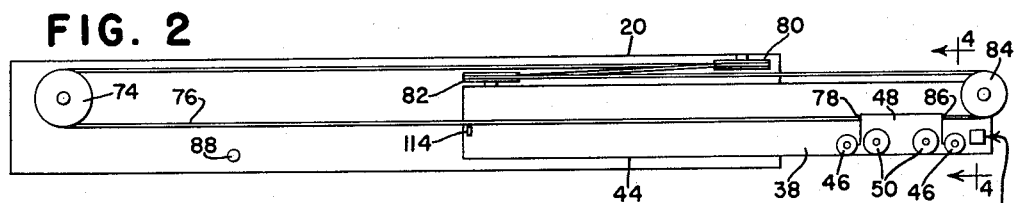
FIGURE 2 is a similar view but showing the boom extended.
Figure 3:
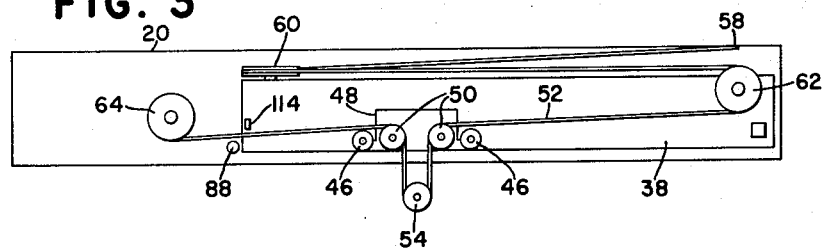
FIGURE 3 is a view of the structure shown in FIGURES 1 and 2 but illustrating the hoist means on the trolley.
Figure 11:
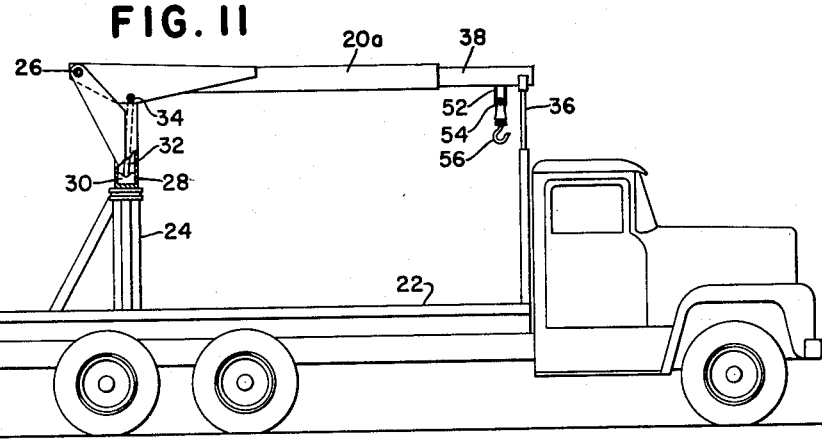
FIGURE 11 illustrates the manner in which the structure of FIGURES 1 through 10 may be incorporated in a flat-bed truck with a derrick or crane system.
Figure 12:
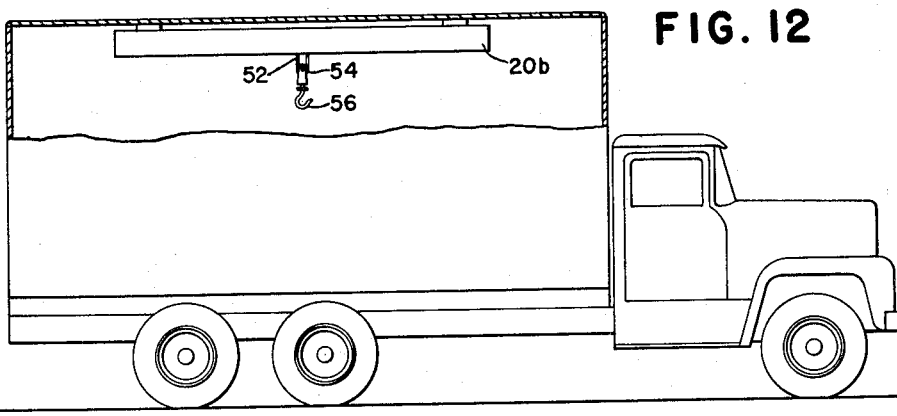
FIGURE 12 illustrates the structure as embodied in a van.

Reference will be had first to FIGURES 1, 2 and 3 for an overall description of the system. In these figures, the numeral 20 designates an elongated relatively fixed track, which may be mounted as shown at 20a in FIGURE 11 or at 20b as shown in FIGURE 12. In FIGURE 11, the vehicle is of the flat-bed type having a platform 22 from which a mast 24 rises to an upper end which has thereon a transverse pivot 26 to which the one end of the track 20a is carried. The upper portion of the mast is hollow to afford a cylinder 28 containing a piston 30 having a piston rod 32 connected at 34 to the portion of the track 20a near the pivot 26. It will be seen that extension and retraction of the piston 20 in the cylinder 28 will effect raising and lowering of the track 20a about the pivot 26. The upper portion of the mast, which contains the cylinder 28, is rotatable relative to the lower part about an upright axis whereby the track 20a, when released from a forward lock 36 may swing about in a 360° range.

With reference again to FIGURES 1, 2 and 3, it will be seen that the track has disposed lengthwise therein a boom 38 appropriately mounted for telescoping movementh relative to the track; that is, the boom can be moved from a starting or retracted position as shown in FIGURE 1 to an extended positon as shown in FIGURE 2, it being understood, of course, that the boom 38 can be extended beyond the position shown in FIGURE 2. The boom 38 is also illustrated in FIGURE 11 but does not appear in FIGURE 12 because it is nested in the track 20b.

Figure 4:
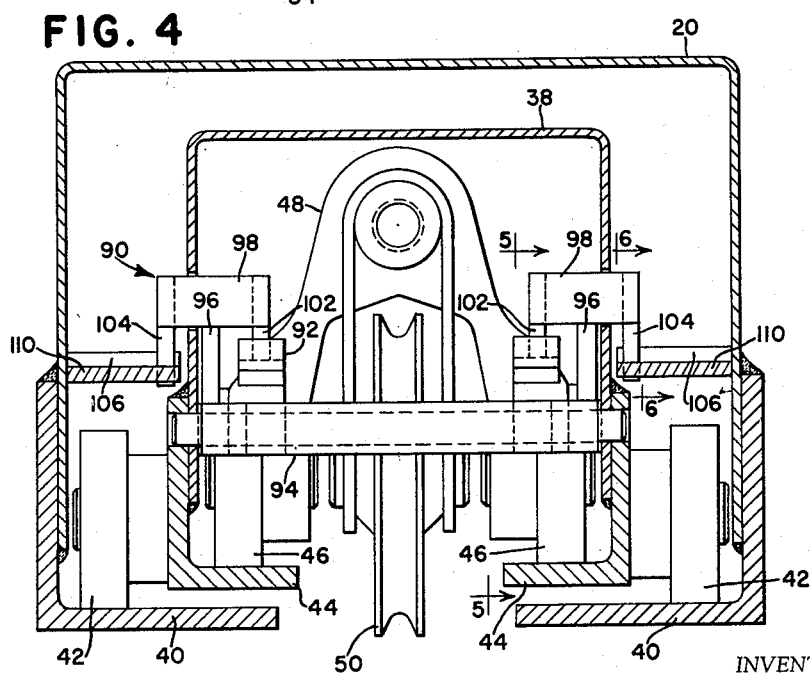
FIGURE 4 is an enlarged section as seen generally along the line 4—4 of FIGURE 2.

FIGURE 4 shows the details of one form of mounting of the boom 38 within the track 20, it being noted that the track has lower flanges 40 on which ride rollers 42 carried by lower portions of the boom 38, themselves forming flanges 44 to provide tracks for rollers 46 journaled on a trolley 48.

In addition to the rollers 46, the trolley 48 carries a pair of sheaves 50 utilized with a hoist cable 52 and a hoist sheave 54. As shown in FIGURE 11, a hook 56 may be suspended from the hoist sheave 54. The cable 52 is anchored at one end at 58 to one end of the track 20 (the right-hand end as seen in FIGURE 3) and then extends to the left and is trained about a sheave 60 at the left-hand end of the boom 38, extending thence to the right and around a sheave 62 at the other end of the boom 38. A force-exerting device, here illustrated as a winch 64 carries the other end of the cable 52, it being clear that the hook 56 and sheave 54 are suspended by the cable between the two trolley sheaves 50. Hence, and assuming that the boom 38 is fixed relative to the track 20, it follows that counterclockwise rotation of the winch 64 will cause the cable 52 to pay out so that the hook 56 and sheave 54 will descend. Clockwise rotation will draw the cable and elevate the hook and lift sheave 54. The hook 56, sheave 54 and portions of the hoist cable 52 are visible in FIGURE 12. The winch 64 may be electrically powered in any conventional manner, many forms of which are well known and therefore not illustrated in detail.

Now, with the boom carried by the track for movement relative thereto, and with the trolley carried by the boom for movement thereof relative to the boom, it remains only to provide means for effecting and controlling this movement. For the purposes of the present description, a second reversible force-exerting device, again preferably in the form of an electrically powered winch, is shown at 74 in association with a force-exerting cable 76 and related sheaves. One end of the cable 76 is dead-ended at 78 to one end of the trolley, being trained thence around the winch 74, extending to the opposite end of the track and trained about a sheave 80, back to a boom-mounted sheave 82, thence to the right and around a second boom-mounted sheave 84 and back to the opposite end of the trolley 48 where it is dead-ended at 86. At this point, it should be noted that in an actual structure, FIGURE 3 will be superimposed on FIGURE 1 so that the entire arrangement is self-contained and compact. The lift cable 52 and its winch 64 have been separated in FIGURE 3 from the travel winch and cable 74-76 for clarity.

The track 20 is provided adjacent to the left-hand end with a boom stop 88 which limits movement of the boom to the left beyond the position shown in FIGURE 1. At the opposite end, there is provided a releasable latching arrangement, designated in its entirety by the numeral 90, for retaining the position of the boom. With the boom 38 held in the position of FIGURE 1, it will be seen that the trolley 48 can be caused to travel back and forth within the range defined by a length of the boom simply by rotating the winch 74 in opposite directions. For example, if the winch 74 is turned in a clockwise direction, the trolley 48 will travel to the left. Conversely if the winch 74 is turned in a counterclockwise direction, the trolley 48 will be caused to travel to the right. Hence, if all that is required is the limited range of the trolley 48 as defined by the length of the track established by the fixed boom, there is no likelihood that the boom will extend beyond the right-hand end of the track, thus making easier the task of the operator, since he need not watch the end of the boom to ascertain whether or not it will interfere with adjacent structure. Normally, this range of movement is sufficient to move the load within the truck, van, or other container in which it is used. However, if it is desired to extend the boom 38 beyond the end of the track, this can be done by cooperation between the trolley and the latch means 90. By way of example, and looking at FIGURE 11 and assuming that the structure 20a-38 is swung away from its transport position as illustrated, the boom 38 can be extended beyond the track 20a to give the structure additional reach. In FIGURE 12, the boom can be extended beyond the rear of the truck so as to carry the articles outwardly through the rear door. In other situations, the structure 20b could be mounted crosswise and the van could be provided with side doors. Other possibilities will readily suggest themselves.

Figure 5:
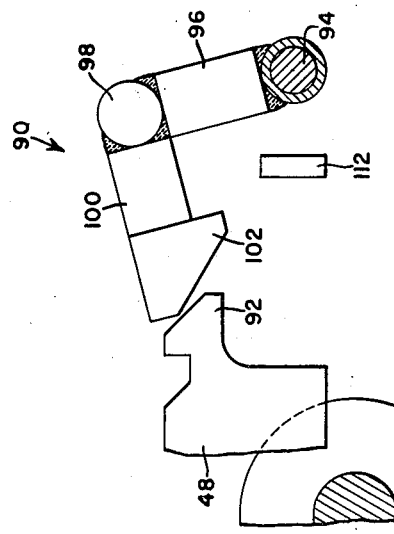
FIGURE 5 is a section seen generally along the line 5—5 of FIGURE 4 and showing the latching means in its position in which the trolley is free for movement but the boom is locked to the track.
Figure 7:
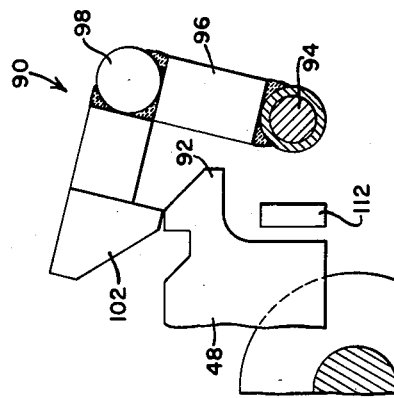
FIGURE 7 is a view smilar to FIGURE 5 but showing the trolley causing release of the latch means from the boom while effecting connection of the latch means to the trolley.
Figure 9:
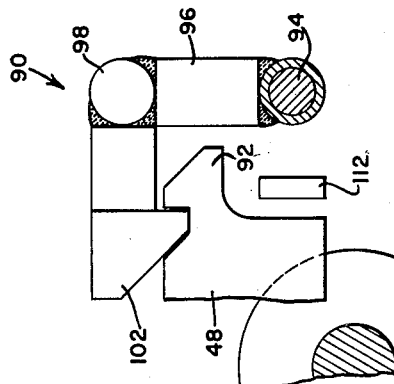
FIGURE 9 is a view similar to FIGURES 5 and 7 but shows the latch means latched to the trolley.

The boom structure was previously described as having lower rails or tracks 44 on which the trolley wheels 46 ride to carry the trolley for back and forth movement along the boom. One of these rails is shown in FIGURES 5, 7 and 9, along with one of the trolley wheels 46 and a portion of the trolley 48, which portion is equipped with a hook 92. Actually there are two hooks 92, symmetrically arranged at opposite sides of the longitudinal center line of the structure, but since these are duplicates only one need be described (FIGURE 4).

The latch means 90 includes a transverse rockshaft 94, appropriately journaled at its opposite ends in sidewalls of the boom 38 (FIGURE 4). Since the section line 6—6 excludes the rockshaft 94, it is shown in broken lines in FIGURES 6, 8 and 10 for purposes of orientation. Rigidly secured to and rising from opposite ends of the rockshaft 94 are a pair of arms 96, to the upper end of each of which is secured a short stubshaft 98. One end of each stubshaft has rigidly secured thereto an arm 100 which is formed at its terminal end in the form of a hook, hereinafter called a trolley latch 102. The trolley latch cooperates with the trolley hook 92, previously described.

Figure 6:
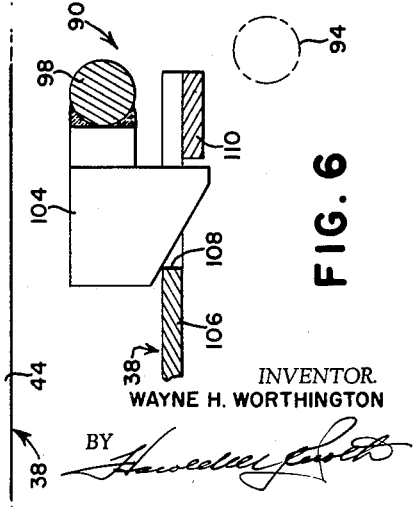
FIGURE 6 is a section on the line 6—6 of FIGURE 4 and illustrates the boom latch, in which respect it should be noted that FIGURES 5 and 6 are coordinated.
Figure 8:
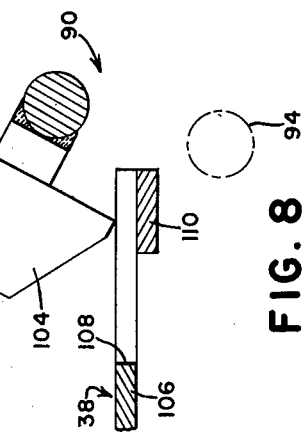
FIGURE 8 is similar to FIGURE 6 and is a companion to FIGURE 7.
Figure 10:
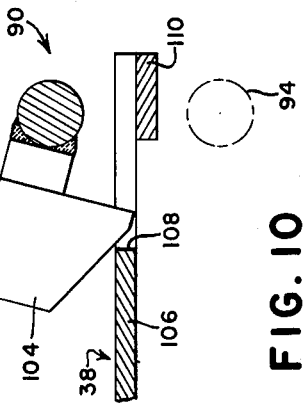
FIGURE 10 is a companion to FIGURE 9.

The opposite end of each stubshaft has rigidly secured thereto a boom latch 104, again in the form of an arm having a hooked terminal end (FIGURES 6, 8 and 10). Each side of the track 20 is provided with a rail or flange 106, having at one end hereof an opening 108 blocked at one end by a cross member in the form of a stop 110. The rails or flanges 106, as well as the stops 110, may be rigidly secured to the side walls of the inverted U-shaped track 20 as by welding; although, any other form of construction may be used. Also provided at the right-hand end of the boom is a trolley stop 112, and a similar stop 114 is provided at the opposite end (FIGURES 1, 2 and 3) to limit the trolley so that it will not escape at either end of the boom.

FIGURES 5 and 6 illustrate a condition in which the boom, in the retracted position of FIGURE 1, is latched to the track so that it cannot escape from the right-hand end thereof. The movement of the boom in the opposite direction is of course prevented by the stop 88. Hence, on the basis of what has been said before, the trolley 48 is capable of moving back and forth within the range defined by opposite ends of the boom. In this condition, the boom latch 104 is engaged in the notch or opening 108 and is thus prevented from moving outwardly or to the right beyond the right-hand end of the track. During this same condition, the trolley hook 92 is free from the trolley latch 102. As shown in FIGURE 5, when the trolley 48 approaches the right-hand end of the boom the trolley hook 92 obviously approaches the trolley latch 102. Movement of the trolley rightward beyond the position of FIGURE 5 causes the hook 92 to ride under the trolley latch 102, rocking the latch control assembly 90 about the axis of the rockshaft 94, achieving the position of FIGURE 7. At the same time, the position of FIGURE 8 is also achieved, since the boom latch 104 is tied in with the trolley latch 102. As shown in FIGURE 8, the boom latch 104 is lifted clear of the stop or cross member 110, thus leaving the opening 108 in the track flange 106. Therefore, the boom is free from the track and therefore can move outwardly along with the trolley as the trolley abuts the stop 112, it being clear that application of power from the winch 74 to move the trolley to the right is now transferred to the boom and moves the boom and trolley simultaneously, thus extending the boom to its maximum limit, which may be determined by any suitable means.

Another feature of importance here is not only that the boom is released from the track but that it is now connected to the trolley as shown in FIGURE 9. That is to say, when the boom has been extended by force applied thereto from the trolley 48 and the trolley is reversed by reversing the winch 74, the trolley latch 102 now drops into the notch into the trolley hook 102 so that as the trolley is moved to the left, it carries the boom with it. When the boom is substantially back to its position of FIGURE 1, the latch 102 being retained by the trolley hook 92, the boom latch 104, as shown in FIGURE 10, cams up on rail or flange 106, just before the left-hand end of the boom strikes the stop 88. Since the boom latch 104 and trolley latch 102 are tied together, lifting of the latch assembly thus frees the trolley latch 102 from the trolley hook 92, and the trolley is free to move to the left without the boom, the boom being of course stopped at 88. When the trolley starts to move again to the right, the slightest shift will cause the boom latch 104 to drop from the position of FIGURE 10 to the position of FIGURE 6, again locking the boom in place. Thus, the boom latch constitutes first releasable means cooperative between the boom and track for holding the boom against movement from its retracted position, and the trolley hook constitutes first trip means for releasing the boom latch. Engagement between the trolley 48 and stop 112 affords abutment means for transferring the force from the trolley to the boom so that the two move together, and the trolley latch is a second releasable means cooperative between the extended boom and the trolley to interconnect it to so that reversal of the winch, to move the trolley to the left, causes the two to move together, whereby the boom is returned to its retracted position. The camming action of the boom latch 104 on the rail or flange 106 is a second trip means operative to release the trolley latch so that once the boom is restored to its retracted position, the trolley is free to move back and forth within the range determined by the length of the boom.

Figure 13:
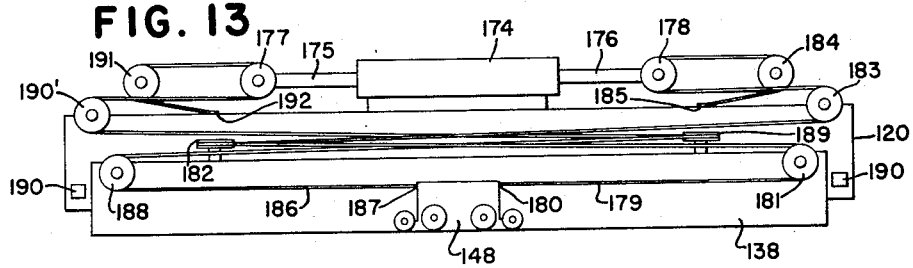
FIGURE 13 is a schematic view of a modified form of system in which the boom is capable of being extended at both ends of the track.
Figure 14:
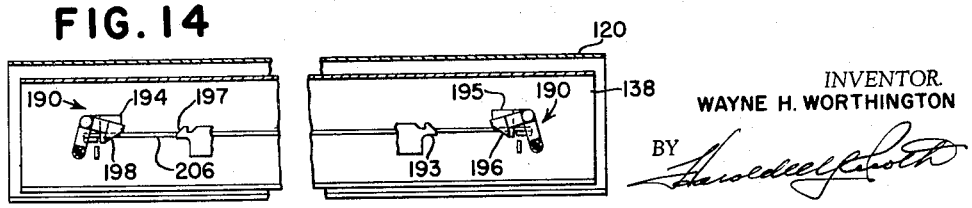
FIGURE 14 is a schematic view showing how the latch structure of FIGURES 5 through 10 could be incorporated at both ends of a dual system as in FIGURE 13.

The foregoing relates to a construction in which the boom is extendible at one end of the track. In FIGURES 13 and 14, the system is utilized in a two-way structure; that is, the boom is capable of being extended at both ends of a track, here designated by the numeral 120. The boom is denoted at 138 and a trolley at 148, the general details being similar to those described above. Latch means 190, each similar to the latch means 90, are provided at opposite ends of the structure (FIGURE 13) to control the position of the boom.

The moving cable arrangement here employs a double-acting hydraulic cylinder 174 having piston rods 175 and 176 extending from opposite ends thereof, and these piston rods respectively carry sheaves 177 and 178. One end of a cable 179 is dead ended at 180 to one side of the trolley 148, extending thence around a boom sheave 181 to the opposite end of the boom and around a second boom sheave 182, thence back toward the right-hand end of the track and around a track sheave 183, around the piston rod sheave 178, around another track-mounted sheave 184 and dead ended to the track at 185. Another cable 186 is dead ended to the trolley at 187 and is trained about a sheave system including sheaves 188, 189, 190', 191, the piston rod sheave 177 and is dead ended to the track at 192. Thus, with the boom in its retracted or central position as illustrated in FIGURE 13, extension and retraction of the double-acting cylinder 174 will cause the trolley to move in one direction or the other. When the trolley moves to the right so that its right-hand trolley hook 193 trips the right-hand latch means 190, the same result will obtain as previously described above in connection with FIGURES 7 and 8. That is, the boom will be released from the latch so that continued rightward movement of the trolley 148 will carry the boom 138 to the right beyond the fixed track 120. Because of the cam surface on the left-hand boom latch 194, it will simply ride the track or rail 206, which corresponds to that previously described at 106. The right-hand boom latch 195 will be freed from its connection with the rail 206 and, when the trolley is reversed for leftward movement, the trolley latch 196 will engage the trolley hook 193. When the boom reaches a position corresponding to that in FIGURES 1 and 13, the trolley latch 196 will become released from the trolley hook 193 and the boom latch 195 will drop in place in the opening in the rail 206. When the trolley reaches the other end, the opposite trolley hook 197 will lift the left-hand trolley latch 197 so as to free the left-hand boom latch 194 from its connection to the rail 206. Thus, the dual latch means are coordinated and provide a duplication of the structure described in connection with FIGURES 1 through 10.

The foregoing illustrates the versatility of the system. On the basis of what is disclosed here, numerous other alterations and modifications may be accomplished, all without departing from the spirit and scope of the invention.

What is claimed is:

1. In combination: an elongated relatively fixed track having inner and outer ends; an elongated boom disposed lengthwise of the track and having inner and outer ends and carried by the track for inward and outward movement between a retracted position and an extended position in which the outer end of the boom projects beyond the outer end of the track; a relatively short trolley carried by the boom for movement relative to the boom between the inner and outer ends thereof; first releasable means cooperative between the boom and track for holding the boom against movement from its retracted position to its extended position; reversible force-exerting means connected between the track and the trolley for moving the trolley back and forth on the boom; first trip means on the trolley and engageable with and for releasing the releasable means when the trolley reaches the outer end of the boom; abutment means on the trolley and engageable with the released boom to effect movement of the boom to its extended position via continued outward action of said force-exerting means on the trolley; second releasable means cooperative between the extended boom and the trolley, with the latter at the outer end of the former, to interconnect the two so that reversal of said force-exerting means acts on the trolley to return the boom to its retracted position; and second trip means on the track and operative to release the second releasable means when the boom reaches its retracted position so as to free the trolley from the boom for further inward movement of the trolley relative to the boom.

2. In combination: an elongated relatively fixed track having inner and outer ends; an elongated boom disposed lengthwise of the track and having inner and outer ends and carried by the track for inward and outward movement between a retracted position and an extended position in which the outer end of the boom projects beyond the outer end of the track; a relatively short trolley carried by the boom for movement relative to the boom between the inner and outer ends thereof; reversible force-exerting means connected between the track and the trolley for moving the trolley back and forth on the boom; means cooperative between the track and boom for holding the boom against movement further inwardly of its retracted position upon inward movement of the trolley; a one-way stop and latch device at the outer end of the boom operative to connect the boom to the track to prevent outward movement of the boom to its extended position during outward movement of the trolley relative to the boom; means on the trolley operative on said device when the trolley reaches the outer end of the retracted boom to disconnect the boom from the track and to connect the boom to the trolley for movement of the boom and trolley in unison to the extended position of the boom and return; and means on the track operative on said device upon return of the trolley with the boom to said retracted position to disconnect the trolley and boom and to re-connect the boom and track.

3. In combination: an elongated relatively fixed track having inner and outer ends; an elongated boom disposed lengthwise of the track and having inner and outer ends and carried by the track for inward and outward movement between a retracted position and an extended position in which the outer end of the boom projects beyond the outer end of the track; a relatively short trolley carried by the boom for movement relative to the boom between the inner and outer ends thereof; reversible force-exerting means connected between the track and the trolley for moving the trolley back and forth on the boom; a boom latch movable on the boom and engaged with the track to prevent outward movement of the boom to its extended position; a trolley latch movable on the boom and disengaged from the trolley to free the trolley for back and forth movement while the boom is in said retracted position; means interconnecting the latches for conjoint movement; first trip means on the trolley operative when the trolley reaches the outer end of the boom to engage the trolley with the trolley latch and to disengage the boom latch from the track for movement of the boom and trolley in unison to the extended position of the boom and return; and second trip means on the track operative when the trolley returns the boom to its retracted position to re-engage the boom latch and to disengage the trolley latch.

4. In combination: an elongated relatively fixed track having inner and outer ends; an elongated boom disposed lengthwise of the track and having inner and outer ends and carried by the track for inward and outward movement between a retracted position and an extended position in which the outer end of the boom projects beyond the outer end of the track; first releasable means cooperative between the boom and track for holding the boom against movement from its retracted position to its extended position; first trip means on the trolley and engageable with and for releasing the releasable means when the trolley reaches the outer end of the boom; abutment means on the trolley and engageable with the released boom to effect movement of the boom to its extended position via continued outward movement of the trolley; second releasable means cooperative between the extended boom and the trolley, with the latter at the outer end of the former, to interconnect the two so that reversal of the trolley for inward movement will return the boom to its retracted position; and second trip means on the track and operative to release the second releasable means when the boom reaches it retracted position so as to free the trolley from the boom for further inward movement of the trolley relative to the boom.

5. In combination: an elongated relatively fixed track; an elongated boom disposed lengthwise of and carried by the track for back and forth movement between starting and extended positions; first releasable means initially operative between the track and boom to hold the boom in its starting position; a trolley carried by the boom for back and forth movement therealong while said boom is in said starting position; means operative in response to a predetermined extent of movement of the trolley in the direciton of the extended position of the boom for releasing the releasable means to free the boom for movement to said extended position; second initially disengaged releasable means engageable between the trolley and boom and operative incident to release of said first releasable means to interconnect the trolley and boom for moving the boom to its extended position and return to its starting position by force applied to the trolley; and means operative upon return of the boom to its starting position for re-engaging the first releasable means and for disengaging the second releasable means.

6. In combination: an elongated relatively fixed track; an elongated boom disposed lengthwise of and carried by the track for back and forth movement between starting and extended positions; a trolley carried by the boom for back and forth movement therealong with a predetermined range; first releasable means initially operative between the track and boom to hold the boom in its starting position; second releasable means initially disengaged between the boom and trolley while the trolley moves in said range; first control means operative by movement of the trolley to the end of said range and in the direction of the extended position of the boom for releasing the first releasable means to free the boom from the track and for engaging the second releasable means to connect the boom to the trolley for movement of the boom to its extended position and return to its starting position by force applied to the trolley; and second control means operative upon return of the boom to its starting position for re-engaging the first releasable means and for disengaging the second releasable means.

7. The invention defined in claim 6, in which: the boom is also movable to a second extended position in the direction opposite to that of the first-mentioned extended position; a third releasable means is provided between the boom and track and initially engaged to prevent movement of the boom to said second extended position; a fourth releasable means is initially provided between the trolley and boom and initially disengaged while the trolley moves short of the opposite end of said range; third control means is provided for operation by movement of the trolley to the second-named end of said range and in the direction of the second-named extended position of the boom for releasing the third releasable means to free the boom from the track and for engaging the fourth releasable means to connect the boom to the trolley for movement of the boom to its second-named extended position and return to its starting position by force applied ot the trolley; and second control means is provided operative upon return of the boom to its starting position for re-engaging the third releasable means and for disengaging the fourth releasable means; each of said first and third releasable means being of the one-way over-running type respectively enabling boom movement upon release of the other of said first and third releasable means.

8. In combination: an elongated relatively fixed track; an elongated boom disposed lengthwise of the track in an initial starting position and carried by the track for movement respectively in opposite lengthwise directions to first and second extended positions and return to said starting position; a trolley carried by the boom for movement lengthwise thereof through a predetermined range having first and second opposite ends, while the boom is in said starting position; first releasable means initially operative between the track and boom to hold the boom in its starting position; second releasable means initially disengaged between the boom and trolley while the trolley moves in said range; first control means operative by movement of the trolley to either end of said range for releasing the first releasable means and for engaging the second releasable means to free the boom from the track and to connect the boom to the trolley for movement of the boom by the trolley to the respective extended position and return to said starting position; and second control means operative upon return of the boom to said starting position from either extended position to re-engage the first releasable means and to disengage the second releasable means.

9. In combination: an elongated relatively fixed track having first and second opposite ends; an elongated boom disposed lengthwise of the track and having first and second opposite ends; means mounting the boom on the track for movement in first and second opposite directions from a neutral position to first and second extended positions in which the first and second ends of the boom project respectively beyond the first and second ends of the track; a trolley movable along the boom between said opposite ends thereof; first and second one-way, over-running releasable boom latch means respectively at said first and second boom ends and both normally latching the boom to the track against movement from said neutral position respectively in said first and second directions but constructed to over-run upon boom movement respectively in said second and first directions; first and second trolley latch means respectively at said first and second boom ends and both normally disengaged from the trolley in said neutral boom position to enable back and forth movement of the trolley relative to the neutrally positioned and latched boom short of said boom ends; first means interconnecting the boom and first trolley latch means for conjoint movement; second means interconnecting the boom and second trolley latch means for conjoint movement; first trip means on the trolley operative when the trolley reaches the first end of the neutrally positioned boom to release the first boom latch means and to engage the first trolley latch means for movement of the boom and trolley in unison to said first extended position and return; second trip means on the trolley operative when the trolley reaches the second end of the neutrally positioned boom to release the second boom latch means and to engage the second trolley latch means for movement of the boom and trolley in unison to said second extended position and return; and first and second restoring means operative when the boom reaches its neutral position respectively from the first and second extended positions to re-engage the respective boom latch means and to disengage the respective trolley latch means.

10. In combination: an elongated relatively fixed track; an elongated boom disposed lengthwise of and carried by the track for back and forth movement between starting and extended positions; releasable means initially operative between the track and boom to hold the boom in its starting position; a trolley carried by the boom for back and forth movement therealong while said boom is in said starting position; means operative in response to a predetermined extent of movement of the trolley in the direction of the extended position of the boom for releasing the releasable means to free the boom for movement to said extended position; means engageable between the trolley and boom and operative when said releasable means is released to provide for the transmission of force from the trolley to the boom for movement of the boom to its extended position by force applied to the trolley; means operative between the trolley and boom for returning the boom to its starting position by force applied to the trolley in the direction of return movement of the boom; and means operative upon return of the boom to its starting position for re-engaging said releasable means.

11. In combination: support structure including an elongated track; an elongated boom disposed lengthwise of and carried by the track for relative back and forth movement between starting and extended positions; releasable means initially operative between the structure and the boom to hold the boom in its starting position; a trolley carried by the boom for relative back and forth movement therealong while said boom is in its starting position; means automatically operative incident to movement of the trolley in the direction of the extended position of the boom for releasing the releasable means to free the boom for movement to said extended position; means automatically operative when said releasable means is released to provide for the transmission of force from the trolley to the boom for moving the boom to its extended position by force applied to the trolley; means operative to return the boom to its starting position by force applied to the trolley in the direction of return movement of the boom; and means for automatically re-engaging said releasable means when the boom returns to its starting position.

References Cited in the file of this patent

UNITED STATES PATENTS

| 2,946,460 | Insolio et al. | July 26, 1960 |
| 3,006,485 | Martin | Oct. 31, 1961 |
| 3,032,213 | Bopp | May 1, 1962 |